United States Patent [19]

Sullivan

[11] Patent Number: 4,865,222

[45] Date of Patent: Sep. 12, 1989

[54] ADAPTER FOR A PACKAGE DISPENSING MACHINE

[75] Inventor: James W. Sullivan, Elizabethtown, Ky.

[73] Assignee: Brown & Williamson Tobacco Corporation, Louisville, Ky.

[21] Appl. No.: 196,514

[22] Filed: May 9, 1988

[51] Int. Cl.[4] .......................... B65G 59/06; A47F 1/10
[52] U.S. Cl. ..................................... 221/241; 221/268
[58] Field of Search ................ 221/241, 242, 264, 268

[56] References Cited

U.S. PATENT DOCUMENTS

| | | | |
|---|---|---|---|
| 758,007 | 4/1904 | Hartell | 221/242 X |
| 1,778,187 | 10/1930 | DuGrenier | 221/264 X |
| 1,939,127 | 12/1933 | Martin et al. | 221/264 X |
| 3,757,997 | 9/1973 | Millies et al. | 221/241 |

FOREIGN PATENT DOCUMENTS 338354  11/1930  United Kingdom ................ 221/241

Primary Examiner—F. J. Bartuska
Attorney, Agent, or Firm—Charles G. Lamb

[57] ABSTRACT

An adapter device for a cigarette package dispensing machine for modifying the dispensing machine to dispense thinner sized packages than the dispensing machine was originally designed to dispense. Typical cigarette package dispenser machines include column support magazines for containing stacked cigarette packages of a predetermined size. The open bottom dispensing end of the magazine is spaced above a horizontal package receiving deck by a distance approximately equal to the thickness of a cigarette package of predetermined size. Cigarette packages are dispensed one at a time from the magazine onto the receiving deck. A plunger moves over the receiving deck beneath the bottom dispensing end of the magazine to push the package from the receiving deck toward a package discharge opening. The adapter includes a panel which is pivotably connected to the plunger for movement with the plunger beneath the dispensing end of the magazine as the plunger moves to prevent more than one thinner sized package from being dispensed at a time from the magazine.

1 Claim, 3 Drawing Sheets

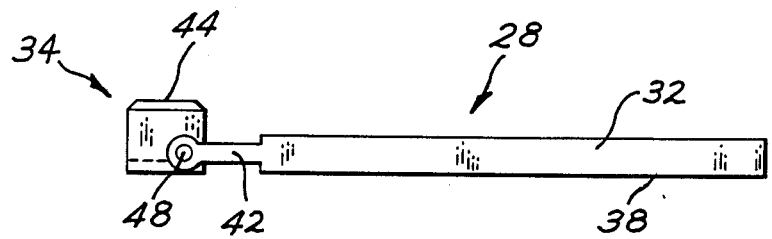
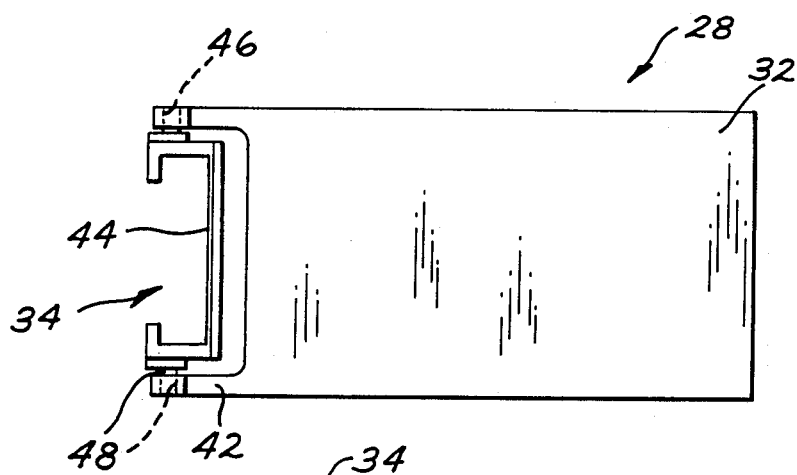
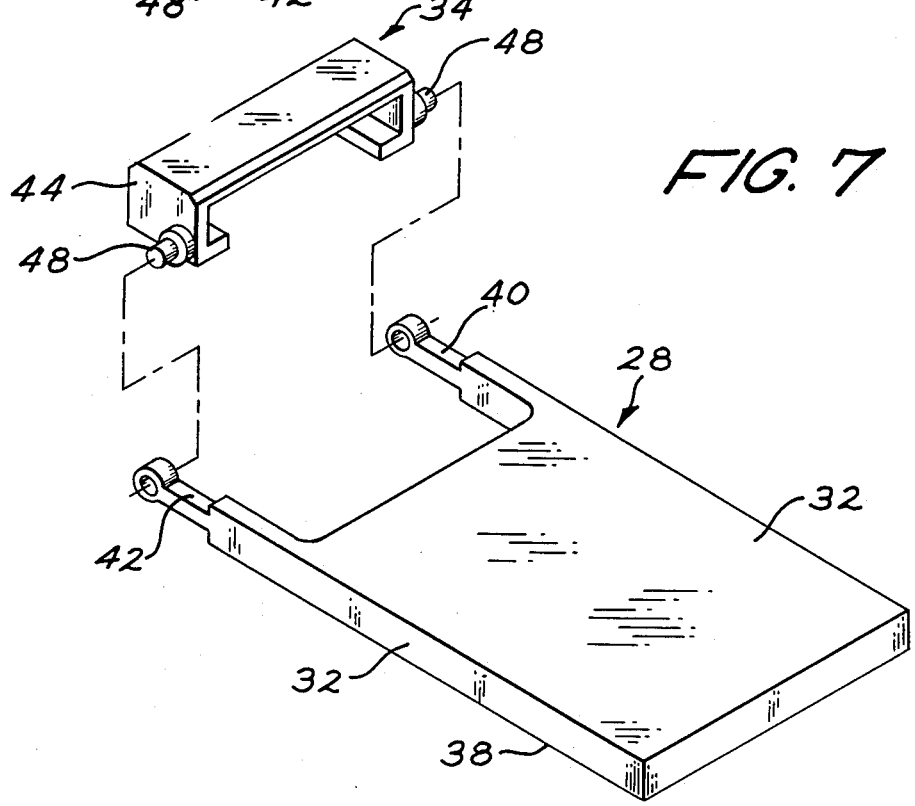

ADAPTER FOR A PACKAGE DISPENSING MACHINE

BACKGROUND OF THE INVENTION

The present invention relates to package dispensing machines, and more particularly to an adapter device for cigarette package dispensing machines for modifying such machines to dispense thinner sized packages than what the dispensing was originally constructed to dispense.

Typical cigarette dispensing machines are designed and constructed to dispense cigarette packages of a predetermined, thickness dimension. These predetermined sized packages are typically about 13/16 of an inch in thickness.

It is contemplated that a market exists for cigarettes in a package of smaller thickness of, for example, ⅝ of an inch thick. It is realized that a substantial portion of the market for cigarettes is machine dispensed sales. However, presently there are no existing cigarette package dispensing machines for dispensing cigarette packages which are thinner than the conventional sized packages. And, it would be extremely expensive to add additional cigarette dispensing machines just to dispense thinner size cigarette packages. Therefore, a need exists for an adapter device for converting existing package dispensing machines to dispense cigarette packages of a thinner dimension than conventional size cigarette packages.

Such an adapter must be relatively inexpensive to manufacture, must be capable of being installed quickly and easily in existing cigarette package dispensing machines, and must be capable of being installed without modification of any of the components of the existing cigarette package dispensing machine.

SUMMARY OF THE PRESENT INVENTION

The present invention recognizes the need for such an adapter and the requirements therefor mentioned above.

More particularly, the present invention provides in a cigarette package dispensing machine of the type having a package column supply magazine for supporting a supply of stacked cigarette packages of a predetermined size, the magazine open bottom package dispensing end being spaced above a horizontal package receiving deck by a distance approximately equal to the thickness of a cigarette package of predetermined size for receiving thereon cigarette packages one at a time from the magazine, a cigarette package dispensing deck slanted downwardly from the horizontal deck to a cigarette package discharge opening, a cigarette package dispensing plunger having a free cigarette package contact end of a thickness approximately equal to the thickness of the cigarette packages of predetermined size movable between a first position adjacent the horizontal deck away from the magazine bottom end and a second position over the horizontal deck beneath the magazine bottom end such that when the plunger moves to the second position the free end of the plunger contacts a cigarette package on the horizontal deck and pushes that package onto the slanted dispensing deck, the improvement of a device for adapting the plunger for dispensing cigarette packages of a smaller thickness than the predetermined package thickness comprising a panel having a length and width approximately equal to the length and width of a cigarette package of predetermined size and a thickness approximately equal to the difference between the thickness of the predetermined sized cigarette package and the thickness of the cigarette package of smaller thickness; and, means for pivotably attaching the panel to the free end of the plunger such that the bottom side of the plunger and bottom side of the panel are in alignment and a portion of the free end of the plunger extends above the top side of the panel; whereby when the plunger is in the first position the panel lays on the horizontal package receiving deck beneath open bottom dispensing end of the magazine, and when the plunger is in the second position the panel lays on the slanted cigarette package dispensing deck.

BRIEF DESCRIPTION OF THE DRAWINGS

The present invention will become even more clear upon reference to the following description in conjunction with the accompanying drawings wherein like numerals refer to like parts and in which:

FIG. 5 is an enlarged side view of the adapter device of the invention;

FIG. 6 is an enlarged plan view of the adapter device of FIG. 5; and,

FIG. 7 is an exploded perspective view of the adapter device of FIGS. 5 and 6.

DETAILED DESCRIPTION OF THE PREFERRED EMBODIMENT

Figure 1:
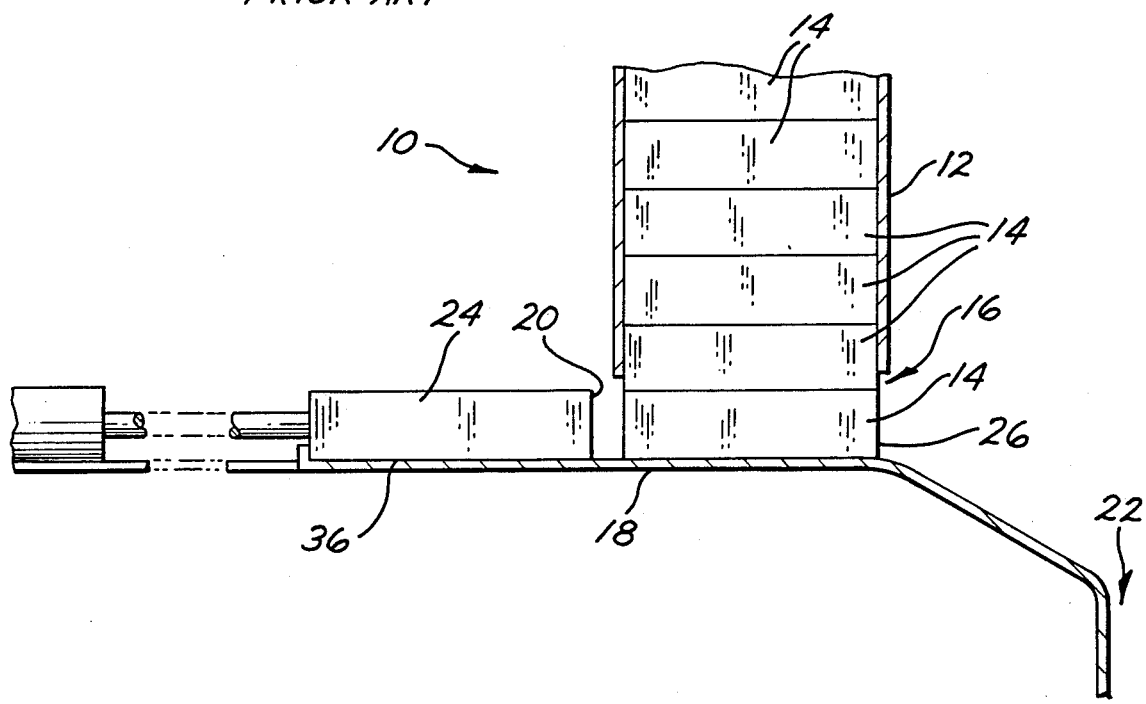
FIG. 1 is a schematic side view of a conventional cigarette package dispensing machine with the plunger in the retracted or first position.
Figure 2:
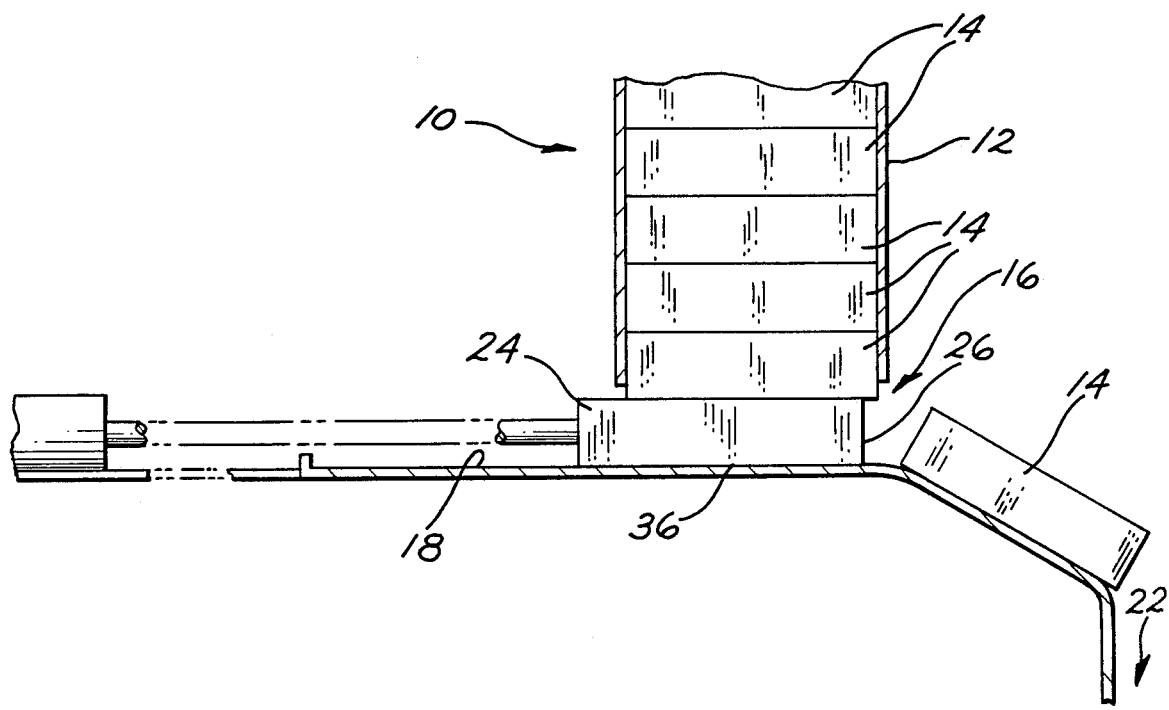
FIG. 2 is a schematic side view of the package dispensing machine of FIG. 1 with the plunger a package dispensing or second position.

First with reference to FIGS. 1 - 2, there is shown in schematic format, a typical cigarette package dispensing machine 10 with which the adapter device of the invention is to be used.

The cigarette package dispensing machine 10 includes a cigarette package column support magazine 12 for supporting a supply of stacked cigarette packages 14 of predetermined thickness, for example, 13/16 of an inch. The magazine 12 has an open bottom package dispensing end 16 is spaced above a horizontal package receiving deck 18 by a distance approximately equal to the thickness of the cigarette package 14 of predetermined size, for example, 13/16 of an inch, for receiving cigarette packages 14 one at a time from the magazine 12. A slanted cigarette package dispensing deck 20 slopes downwardly from the horizontal deck 18 to a cigarette package discharge opening 22. A cigarette package dispensing plunger 24 is movable between a first position shown in FIG. 1 adjacent the horizontal deck 18 away from the magazine bottom dispensing end and a second position shown in FIG. 2 over the horizontal deck 18 beneath the magazine bottom dispensing end. The plunger 24 has a free cigarette package contact end 26 of a thickness approximately equal to the thickness of the cigarette package 14 of predetermined thickness. As the plunger 24 moves to its second position, the free end 26 of the plunger 24 contacts the cigarette package 14 on the horizontal deck 14 and pushes that package onto the slanted dispensing deck 20. The cigarette package 14 slides down the slanted dispensing deck 20 to the package discharge opening 22 for discharge to the outside of the machine 10 to the customer.

When thinner cigarette packages are dispensed from the conventional machine, it is possible for more than one package at a time to be dispensed from the bottom dispensing end of the magazine onto the horizontal deck 18 which can cause the machine to jam, or dispense two such thinner packages.

Figure 3:
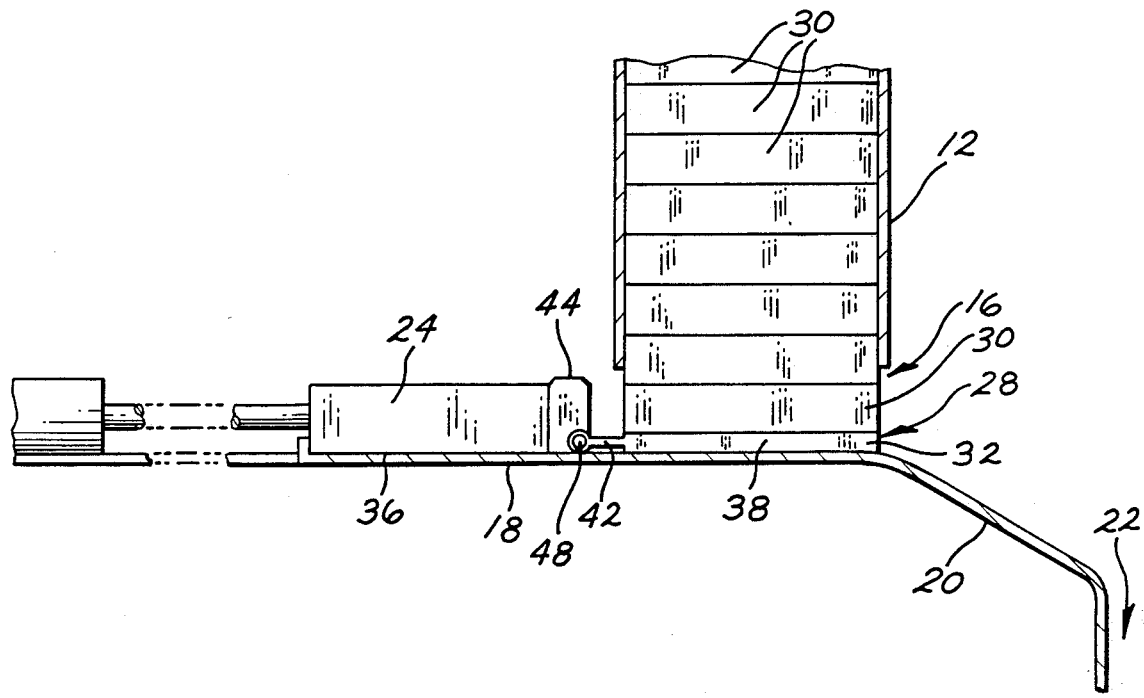
FIG. 3 is a schematic side view of a conventional cigarette package dispensing machine with the plunger in the first position and with the adapter device of the invention attached thereto.
Figure 4:
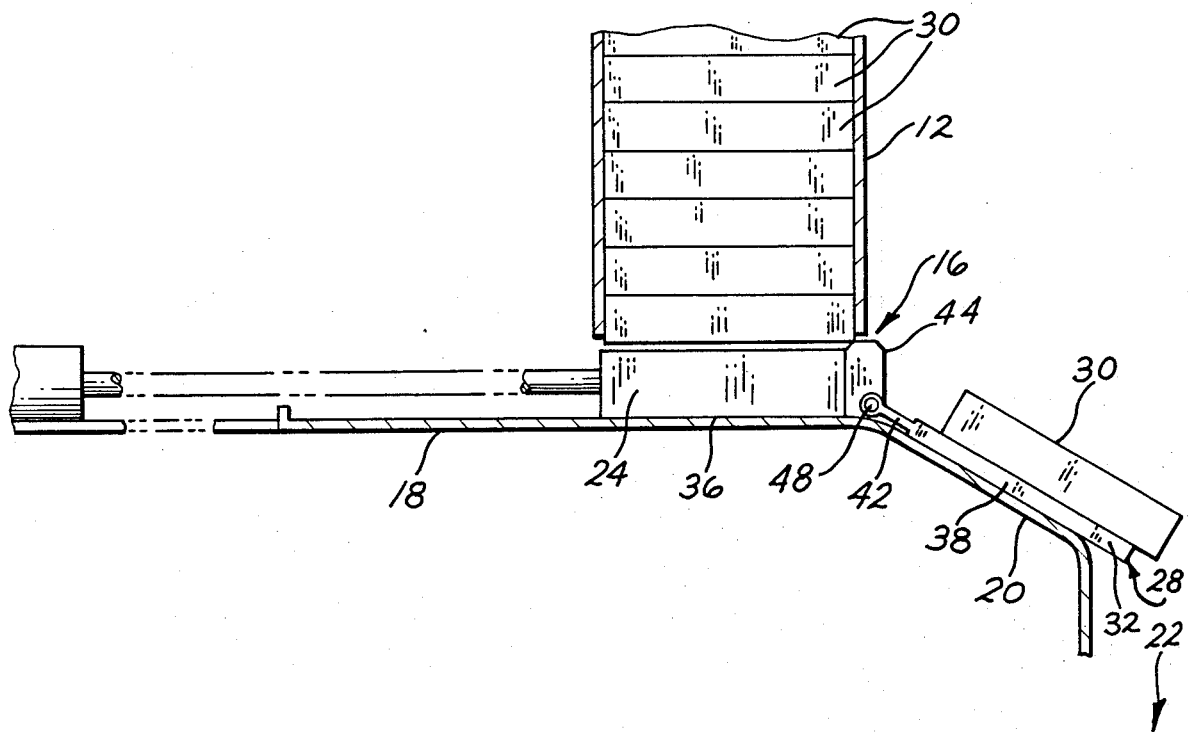
FIG. 4 is a schematic side view of the dispensing machine of FIG. 3 with the plunger in a package dispensing or second position.

With reference to FIGS. 3 and 4, the present invention provides an adapter device 28 to prevent more than one of the thinner than conventional cigarette packages 30 from being dispensed from the magazine 12 onto the horizontal deck 18.

As shown, the adapter device 28 comprises a panel 32 having a length and width approximately equal to the length and width of a conventionally sized cigarette package and a thickness approximately equal to the difference in thickness between the thickness of the conventional or predetermined sized cigarette package 14 and the thickness of the thinner cigarette package 30. The adapter device 28 further comprises means 34 for pivotable attaching the panel 32 to the free cigarette package contact end 26 of the plunger 24 such that the bottom side 36 of the plunger 24 and the bottom side 38 of the panel 32 are in alignment when the plunger 24 is in the first position shown in FIG. 3.

Now with reference to FIGS. 5, 6, and 7, the panel 32 is shown as having two spaced apart parallel legs 40 and 42 extending from opposite lateral sides of the panel in a rearward direction. The pivotable attaching means 34 includes a generally U-shaped clamp 44 which receives the free end 26 of the plunger 24 such that the opposite arms of the clamp engage opposite lateral sides of the plunger 24 thereby engaging the plunger 24. The clamp 44 has transversely extending axles 46 and 48 which are received in appropriate apertures in the free ends of the legs 40 and 42 so that the panel 32 will pivot about the axles 46 and 48 relative to the clamp 44 and, therefore, relative to the plunger 24.

With reference to FIGS. 3 and 4, in operation, with the plunger 24 in its first position (see FIG. 3), the panel 24 lays on the horizontal deck 14 beneath the bottom dispensing end of the magazine 12. The space between the top side of the panel 24 and bottom dispensing end of the magazine is approximately equal to the thickness of the thinner cigarette package 30. Thusly, only one thinner cigarette package 30 at a time can exit the bottom dispensing end of the magazine 12 onto the top side of the panel 24. As the plunger 24 is pushed toward its second position, the portion of the package contact end 26 of the plunger 24 contacts the cigarette package 30 on the panel 32 and the panel 32 moves with the plunger 24 moving the cigarette package 30 away from the magazine 12 toward the slanted dispensing deck 20. When the plunger 24 has reached its second position (see FIG. 4), the panel 32 pivots about the axles 46, 48 so that the panel 32 will overlay the slanted dispensing deck 20. The cigarette package 30 then slides off the panel 32 and falls down the slanted dispensing deck 20 and through the package discharge opening.

The foregoing detailed description is given primarily for clearness of understanding and no unnecessary limitations are to be understood therefrom for modification will become obvious to those skilled in the art and may be made without departing from the spirit of the invention or scope of the appended claims.

What is claimed is:

1. In a cigarette package dispensing machine of the type having a package column supply magazine for supporting a supply of stacked cigarette packages of a predetermined size, the magazine open bottom package dispensing end being spaced above a horizontal package receiving deck by a distance approximately equal to the thickness of a cigarette package of predetermined size for receiving thereon cigarette packages one at a time from the magazine, a cigarette package dispensing deck slanted downwardly from the horizontal deck to a cigarette package discharge opening, a cigarette package dispensing plunger having a free cigarette package contact end of a thickness approximately equal to the thickness of the cigarette packages of predetermined size movable between a first position adjacent the horizontal deck away from the magazine bottom end and a second position over the horizontal deck beneath the magazine bottom end such that when the plunger moves to the second position the free end of the plunger contacts a cigarette package on the horizontal deck and pushes that package onto the slanted dispensing deck, the improvement of a device for adapting the plunger for dispensing cigarette packages of a smaller thickness than the predetermined package thickness comprising:

a panel having a length and width approximately equal to the length and width of a cigarette package of predetermined size and the thickness approximately equal to the difference between the thickness of the predetermined sized cigarette package and the thickness of the cigarette package of smaller thickness; and, means for pivotable attaching the panel to the free end of the plunger such that the bottom side of the plunger and bottom side of the panel are in alignment when the plunger is in the first position and a portion of the free end of the plunger extends above the top side of the panel wherein the means for pivotable attaching the panel to the free end of the plunger comprises: a U-shaped clamp for engaging the lateral sides of the free end of the plunger; and, a hinge joint interconnecting the plunger clamp and the panel;

whereby when the plunger is in the first position the panel lays on the horizontal package receiving deck beneath open bottom dispensing end of the magazine, and when the plunger is in the second position the panel lays on the slanted cigarette package dispensing deck.

* * * * *